(12) United States Patent
Tanizoe et al.

(10) Patent No.: US 7,956,907 B2
(45) Date of Patent: Jun. 7, 2011

(54) IMAGE CAPTURE DEVICE WITH LOW-FREQUENCY NOISE SUPPRESSION

(75) Inventors: Yukihiro Tanizoe, Osaka (JP); Yoshimasa Okabe, Osaka (JP); Yuuji Shigeta, Osaka (JP); Yasutoshi Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 265 days.

(21) Appl. No.: 11/843,310

(22) Filed: Aug. 22, 2007

(65) Prior Publication Data

US 2008/0049124 A1 Feb. 28, 2008

(30) Foreign Application Priority Data

Aug. 23, 2006 (JP) ................................ 2006-226179

(51) Int. Cl.
*H04N 5/262* (2006.01)
(52) U.S. Cl. ..................................... 348/240.2; 348/241
(58) Field of Classification Search ............... 348/222.1, 348/224.1, 231.99, 240.99, 240.1, 240.2, 348/241
See application file for complete search history.

(56) References Cited

U.S. PATENT DOCUMENTS

| 5,521,636 | A  | * | 5/1996  | Nakayama et al. ......... 348/222.1 |
| 6,982,755 | B1 | * | 1/2006  | Kikuzawa ..................... 348/241 |
| 2001/0052971 | A1 |   | 12/2001 | Tsuchiya et al. |
| 2003/0151687 | A1 | * | 8/2003  | Yoshida ................... 348/333.03 |
| 2004/0085459 | A1 |   | 5/2004  | Hoshuyama et al. |
| 2004/0119871 | A1 | * | 6/2004  | Nobuoka ....................... 348/349 |
| 2004/0212692 | A1 | * | 10/2004 | Nakami et al. .............. 348/224.1 |
| 2006/0181630 | A1 | * | 8/2006  | Shioji et al. .............. 348/333.01 |
| 2006/0290791 | A1 | * | 12/2006 | Takane ..................... 348/231.99 |

FOREIGN PATENT DOCUMENTS

| JP | 11-041491     |   | 2/1999  |
| JP | 2001-186366   | A | 7/2001  |
| JP | 2002-095009   |   | 3/2002  |
| JP | 2002-141778   | A | 5/2002  |
| JP | 2003-234950   | A | 8/2003  |
| JP | 2004-260265   | A | 9/2004  |
| JP | 2004-304641   | A | 10/2004 |

OTHER PUBLICATIONS

Notice of Reasons for Rejection for corresponding Japanese Application No. 2007-215444 dated Mar. 22, 2011 with English translation.

* cited by examiner

*Primary Examiner* — Gevell Selby
(74) *Attorney, Agent, or Firm* — Renner, Otto, Boisselle & Sklar, LLP

(57) ABSTRACT

An image capture device which can reduce low-frequency noise even circuitry of a small scale is provided. An image capture device includes: an acquisition section which is used to acquire sensitivity information concerning a sensitivity; an imager for generating first image data; a zoom section for changing a size of an image which is based on input image data, the zoom section outputting second image data which is obtained by reducing a size of an image represented by the first image data; and a noise suppression section for outputting third image data which is obtained by reducing noise in an image represented by the second image data. In accordance with the sensitivity information, the zoom section changes a zoom factor by which to reduce the size of the image represented by the first image data.

8 Claims, 10 Drawing Sheets

$a_{i-1j-1}$ $\quad$ $a_{i-1j}$ $\quad$ $a_{i-1j+1}$ $a_{ij-1}$ $\quad$ $a_{ij}$ $\quad$ $a_{ij+1}$ $a_{i+1j-1}$ $\quad$ $a_{i+1j}$ $\quad$ $a_{i+1j+1}$ Zoom-Out Process

IMAGE CAPTURE DEVICE WITH LOW-FREQUENCY NOISE SUPPRESSION

BACKGROUND OF THE INVENTION

1. Field of the Invention

The present invention relates to an image capture device having a function of removing the noise of an image which has been shot.

2. Description of the Related Art

Conventionally, image capture devices having a function of removing the noise which occurs in an image sensor or the like are known. For example, an image capture device which is described in Japanese Laid-Open Patent Publication No. 11-41491 suppresses random noise through a low-pass filtering process using a two-dimensional filter.

In a low-pass filtering process using a two-dimensional filter, a pixel to be processed and a plurality of pixels ("neighboring pixels") positioned in the neighborhood of that pixel are utilized to determine a pixel value for the pixel to be processed. Specifically, by utilizing the pixel value of the pixel to be processed and the pixel values of the neighboring pixels, presence or absence of correlation between the pixel to be processed and each neighboring pixel is determined. Then, an arithmetic mean value of the pixel value of the pixel to be processed and the pixel values of those neighboring pixels which have been determined as being correlated is calculated, and this value is used as the pixel value of the pixel to be processed.

The noise suppression effect of a two-dimensional filtering process depends on the range of pixels utilized for the calculation of an arithmetic mean value. In order to obtain a large effect, it is necessary to select neighboring pixels from a wide range over the image, so as to be subjected to correlation determination. Especially in order to suppress low-frequency noise, it is necessary to select a plurality of neighboring pixels from a wide range, and their pixel values must be added. However, increasing the range of neighboring pixels leads to an increase in the capacity of the memory for storing the pixel values of the neighboring pixels, as well as an increase in the scale of circuitry need for correlation detection and addition/subtraction. This invites an increased cost of the image capture device, and hinders downsizing.

SUMMARY OF THE INVENTION

An object of the present invention is to provide an image capture device which can reduce low-frequency noise even circuitry of a small scale.

An image capture device according to the present invention comprises: an acquisition section which is used to acquire for acquiring sensitivity information concerning a sensitivity; an imager for generating first image data; a zoom section for changing a size of an image which is based on input image data, the zoom section outputting second image data which is obtained by reducing a size of an image represented by the first image data; and a noise suppression section for outputting third image data which is obtained by reducing noise in an image represented by the second image data, wherein, in accordance with the sensitivity information, the zoom section changes a zoom factor by which the size of the image represented by the first image data be reduced.

The image capture device may further comprise a band adjuster for restricting a band of sampling frequencies for the first image data.

Another image capture device according to the present invention comprises: a manipulation section which is used to acquire size information concerning an image size; an imager for generating first image data; a zoom section for outputting second image data which is obtained by reducing a size of an image represented by the first image data based on the size information; a noise suppression section for outputting third image data which is obtained by reducing noise in an image represented by the second image data; and an encoder for performing an encoding process for the third image data.

Yet another image capture device according to the present invention comprises: a manipulation section which is used to acquire format information concerning an image format; an imager for generating first image data; a zoom section for outputting second image data which is obtained by reducing a size of an image represented by the first image data based on the format information; a noise suppression section for outputting third image data which is obtained by reducing noise in an image represented by the second image data; and an encoder for performing an encoding process for the third image data.

The manipulation section may acquire format information concerning a relationship between spatial frequencies of color components of light.

The image capture device may further comprise a separator for separating and outputting a plurality of color component signals from the image represented by the first image data, and the zoom section may reduce a size of a color component image corresponding to each of the plurality of color component signals based on the format information.

The manipulation section may further acquire compression ratio information concerning a compression ratio; and in accordance with the compression ratio specified by the compression ratio information, the noise suppression section may change a method for reducing the noise in the image represented by the second image data.

With an image capture device according to the present invention, after an image is subjected to a zoom-out process, a noise reduction (noise suppression) process is performed. Pixels existing in a wide range over the image before the zoom-out process are contained within a narrow range in the image after the zoom-out process. This makes it possible to suppress low-frequency noise in the image before the zoom-out process by using a noise suppression section that is constructed from small-scale circuitry which is not capable of adding up a large number of pixels, i.e., a noise suppression section which suppresses noise by utilizing neighboring pixels selected from a narrow range.

Furthermore, the image capture device changes the zoom factor of reduction in accordance with sensitivity information concerning sensitivity. As a result, the balance between the noise suppression effect and deterioration in resolution can be adjusted depending on the amount of noise that may be contained in the image. For example, in the case where the sensitivity is high and there may occur a large amount of noise such as random noise, a large noise suppression effect can be obtained by employing a smaller factor for the zoom-out process. On the other hand, in the case where the sensitivity is low and less noise is likely to occur, an image which does not suffer much deterioration in resolution associated with a zooming-out can be obtained by employing a greater factor for the zoom-out process.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the present invention will be described with reference to the accompanying drawings.

Embodiment 1

Hereinafter, with reference to the attached drawings, embodiments of the image capture device according to the present invention will be described. An image capture device of the present embodiment is, for example, a so-called digital camera which writes data of an image which has been shot to a memory card.

1-1. Construction of Image Capture Device

Figure 1:
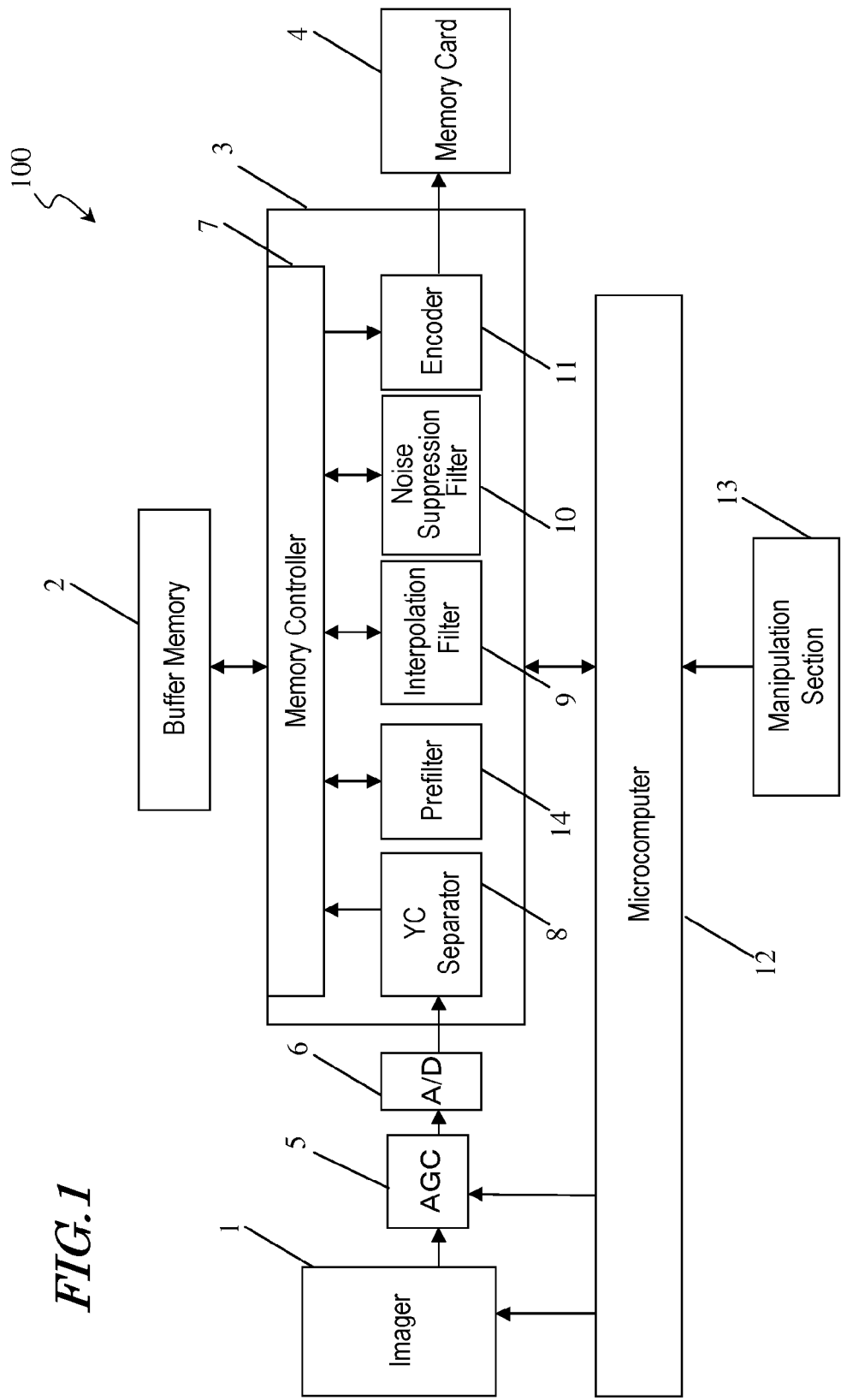
FIG. 1 is a block diagram showing the construction of an image capture device 100 according to Embodiment 1.

FIG. 1 is a block diagram showing the construction of an image capture device 100 of the present embodiment.

The image capture device 100 includes an imager 1, a buffer memory 2, a digital signal processor (DSP) 3, an automatic gain control section (AGC) 5, an A/D converter 6, a microcomputer 12, and a manipulation section 13.

The imager 1 obtains optical signals by converging light with lens(es) (not shown), and converts the signals to electrical signals. For example, the imager 1 is a CCD image sensor, a CMOS image sensor, an NMOS image sensor, or the like. The electrical signals obtained through conversion are analog signals, i.e., three color signals of red (R), green (G), and blue (B), representing the object image. The electrical signals each have a level (gain) which is in accordance with the object image.

The AGC 5 adjusts the gains of input analog signals. The A/D converter 6 converts the gain-adjusted signals to digital signals. The digital signals are sent to the DSP 3 as image data before processing, and processed by the DSP 3. During the processing by the DSP 3, a buffer memory 2 temporarily retains data.

The DSP 3 performs various signal processing, e.g., a Y/C separation process, a zoom-out process, an interpolation process, a noise suppression process, an encoding process, and the like. The DSP 3 includes a memory controller 7, a YC separator 8, an interpolation filter 9, a noise suppression filter 10, and an encoder 11.

The YC separator 8, the interpolation filter 9, the noise suppression filter 10, and the encoder 11 are implemented in software as the DSP 3 executes preprogrammed processes. Since these functional constituent elements are to be independently realized, they are illustrated in the figures as functional blocks, and described in the present specification as independent constituent elements of the image capture device 100.

Note that they can also be implemented as independent hardware circuits, instead of being functionally implemented by the DSP 3. The DSP 3 and the microcomputer 12 (described later) may be formed into one integrated circuit.

The YC separator 8 separates a plurality of color component signals from the image represented by the image data, i.e., a luminance signal and color difference signals. The luminance signal Y and color difference signals Cb and Cr can be obtained through the following equations, where the levels of color components of red, green, and blue are denoted as R, G, and B.

$$Y = 0.299R + 0.587G + 0.114B$$

$$Cb = -0.169R - 0.331G + 0.500B$$

$$Cr = 0.500R - 0.419G - 0.081B$$

The data corresponding to each color component signal is temporarily stored to the buffer memory 2 via the memory controller 7.

Based on an instruction from the microcomputer 12, the interpolation filter 9 performs a zoom-out process/zoom-in process for the image data which is stored in the buffer memory 2. For example, a zoom-out process is implemented by subsampling, at a constant interval, some of the pixels composing the image. On the other hand, a zoom-in process is realized by: interpolating a new pixel(s) between existing pixels, the new pixel(s) having the pixel value of one of the existing pixel values; or interpolating a new pixel(s) between existing pixels, each new pixel having a pixel value which is obtained by taking a weighted arithmetic mean of the values of two adjoining pixels along the right-left direction (in the case of the horizontal direction) or two adjoining pixels along the upper-lower direction (in the case of the vertical direction) from the position of the pixel to be interpolated, the weighting being performed in accordance with the distance from the position of the pixel to be interpolated. This process is referred to as a linear interpolation process.

With the construction described later, the noise suppression filter 10 performs a noise suppression process for the input luminance and color signals and outputs the result.

The encoder 11 compresses the image data for storage to a memory card 4.

Before the interpolation filter 9 performs a zoom-out process, a prefilter 14 performs a band restriction process for suppressing aliasing noise.

In accordance with a user's instruction which is given via the manipulation section 13, the microcomputer 12 controls the series of operations.

Next, the specific construction of the noise suppression filter 10 will be described.

Figure 2:
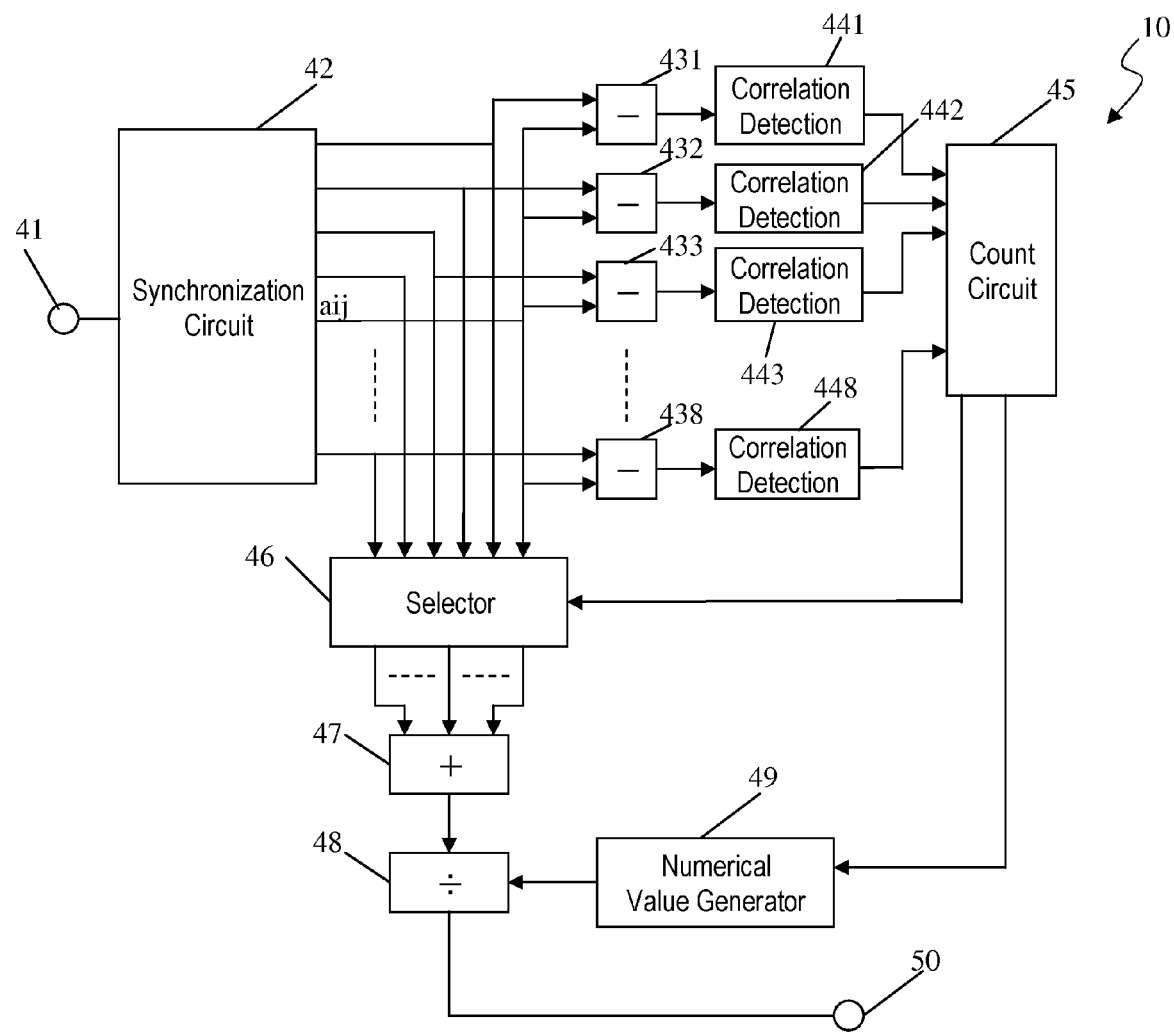
FIG. 2 is a diagram showing the construction of a noise suppression filter 10 employing a two-dimensional filter.

FIG. 2 shows the construction of the noise suppression filter 10 employing a two-dimensional filter. The noise suppression filter 10 includes an input terminal 41, a synchronization circuit 42, subtraction circuits 431 to 438, correlation detection sections 441 to 448, a count circuit 45, a selector 46, an adder circuit 47, a division circuit 48, a numerical value generator 49, and an output terminal 50.

An image signal which is input from the input terminal 41 is input to the synchronization circuit 42. The synchronization circuit 42 synchronizes a pixel to be processed and eight neighboring pixels surrounding the pixel to be processed (i.e., a total of eight pixels adjoining the pixel to be processed in the four directions of upper/lower/right/left and four more oblique directions) for output. The pixel to be processed and the eight neighboring pixels will be collectively referred to as a "signal block".

Figure 3:
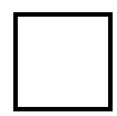
FIG. 3 is a diagram showing an exemplary signal block which is created by a synchronization circuit 42.
Figure 3:
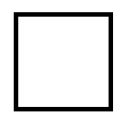
Figure 3:
Figure 3:
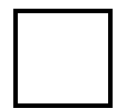
Figure 3:
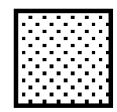
Figure 3:
Figure 3:
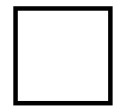
Figure 3:
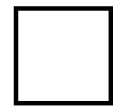
Figure 3:
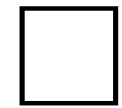

FIG. 3 shows an exemplary signal block created by the synchronization circuit 42. The pixel to be processed is the center pixel aij.

The subtracters 431 to 438 calculate differences between the pixel to be processed and the respective neighboring pixels. The correlation detection sections 441 to 448 detect correlation between the pixel to be processed and the respective neighboring pixels. For example, correlation may be detected when the absolute value of the output value of a subtracter is found to be smaller than a threshold value.

To the selector 46, the count circuit 45 notifies those pixels which have been determined as correlated. To the numerical value generator 49, the count circuit 45 outputs the number of pixels which have been determined as correlated.

Among the outputs from the synchronization circuit 42, the selector 46 substitutes "0" for those neighboring pixels which have been determined as uncorrelated, and outputs this value to the adder circuit 47. The adder circuit 47 adds up the outputs from the selector 46. The numerical value generator 49 adds one to the number of neighboring pixels which have been determined as correlated, and outputs the resultant value. The division circuit 48 divides the output from the adder circuit 47 by the output from the numerical value generator 49.

The output from the numerical value generator 49 is the number of pixels which have been added up by the adder circuit 47. Therefore, the division circuit 48 outputs an arithmetic mean value of the pixel being processed and any neighboring pixels having been determined as correlated to the pixel being processed.

Through the above process, an output signal is obtained in which any random noise that has an amplitude smaller than the threshold value used for correlation detection is suppressed. On the other hand, if there is a large change in pixel value between adjoining pixels, as at the edges of an object, the amount of change will be greater than the threshold value used for correlation detection, so that the filtering process will not be performed. As a result, blurring of an object edge due to a two-dimensional filtering process can be prevented.

1-2. Operation of Image Capture Device

Next, the operation of the image capture device 100 of the present embodiment will be described.

Figure 4:
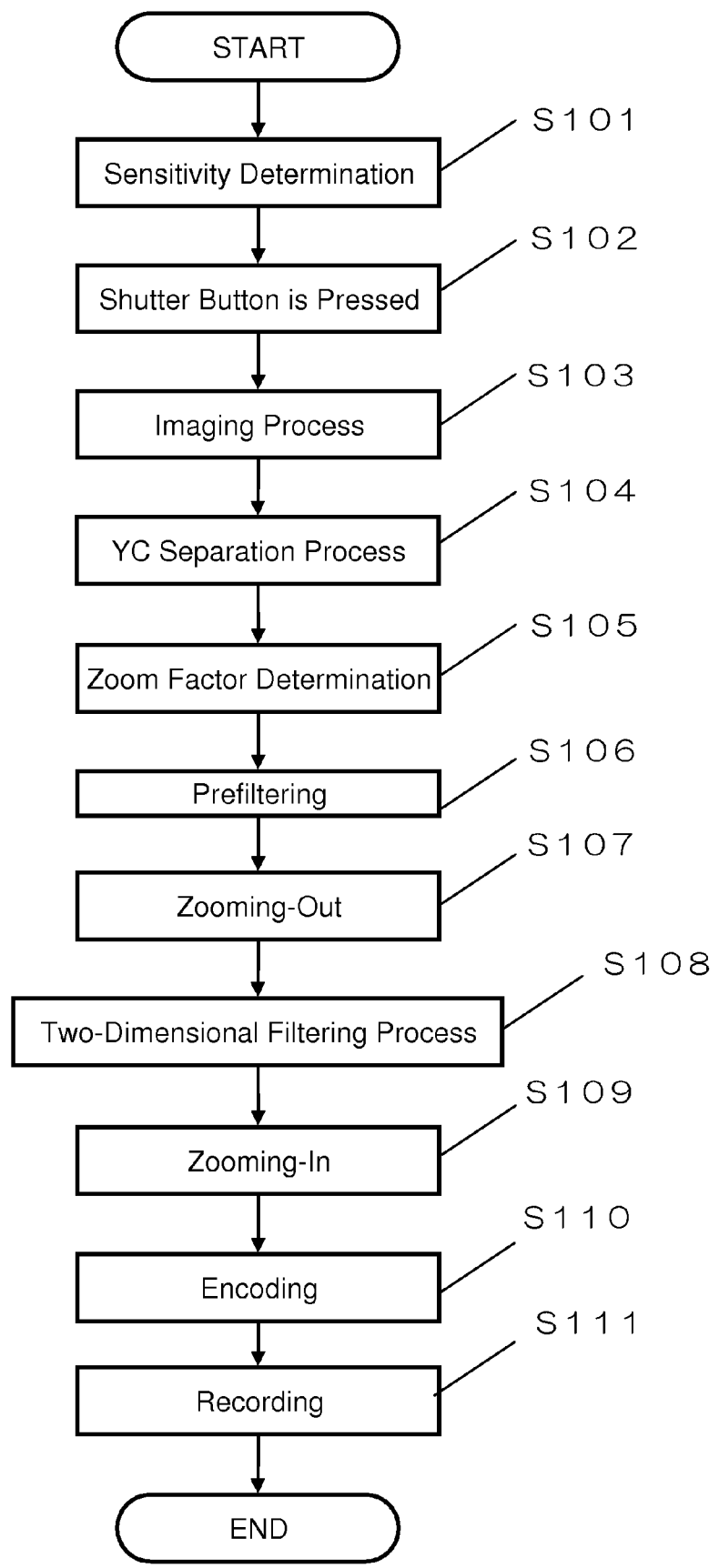
FIG. 4 is a flowchart showing a procedure of processing by the image capture device 100.

FIG. 4 is a flowchart showing a procedure of processing by the image capture device 100.

At step S101, the microcomputer 12 acquires an ISO sensitivity based on a user's instruction which is given via the manipulation section 13, or based on exposure measured by an exposure meter (not shown).

Next, at step S102, the microcomputer 12 keeps monitoring whether a shutter button (not shown) which is provided in the manipulation section 13 has been pressed or not. If the shutter button is pressed, control proceeds to the next step S103.

At step S103, the imager 1, the AGC 5, and the A/D converter 6 generate image data under the control of the microcomputer 12. Based on a gain which is in accordance with the ISO sensitivity that has been acquired, the image data that has been generated receives a gain adjustment by the AGC 5, and has been converted by the A/D converter 6 into a digital signal.

At step S104, from the image data that has been digitized by the A/D converter 6, the YC separator 8 separates the luminance signal and color signals.

Figure 5:
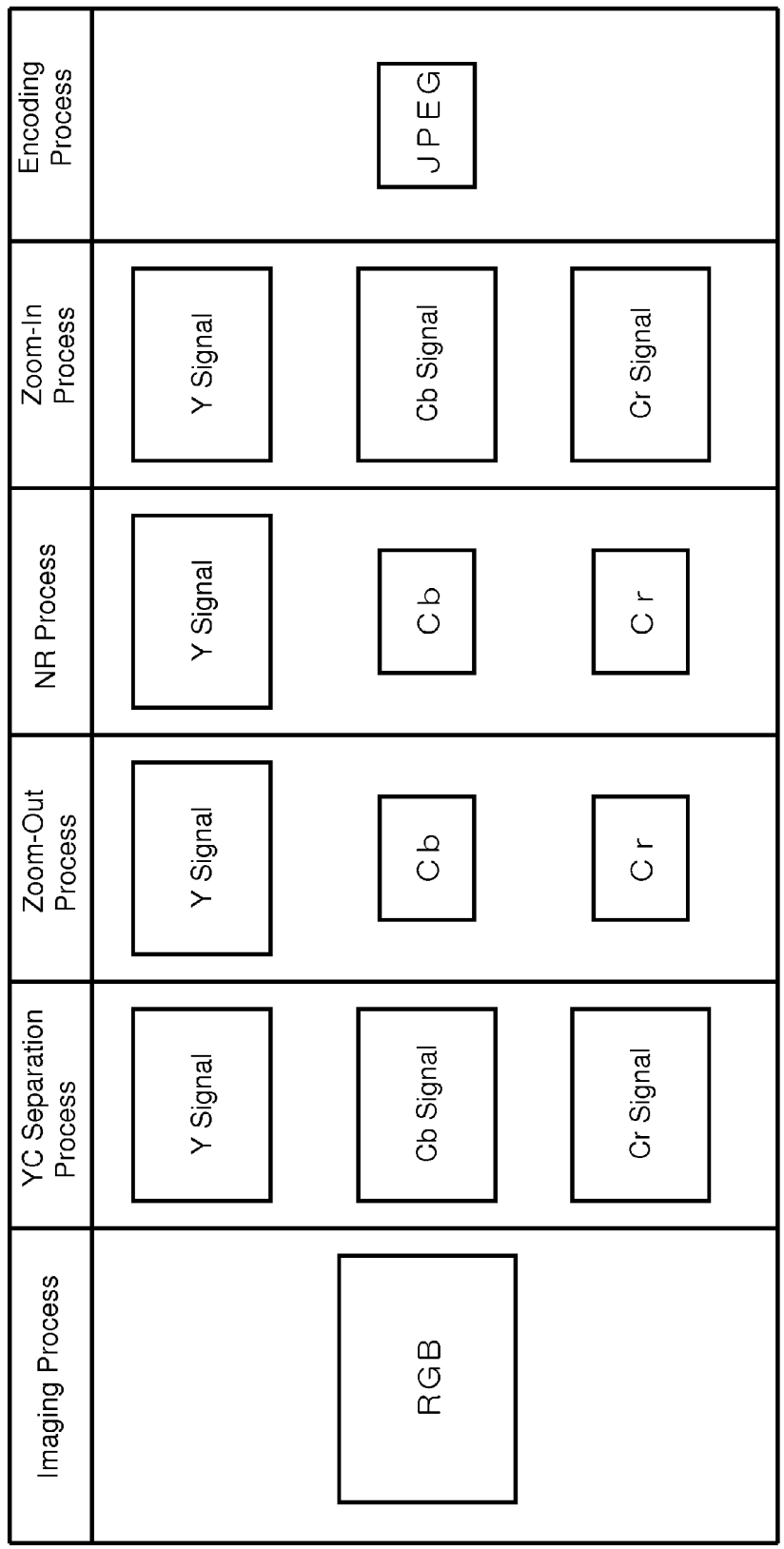
FIG. 5 is a schematic diagram illustrating processes from step S103 to S110 in FIG. 4.

At step S105, the microcomputer 12 determines a zoom-out/in factor which is in accordance with the ISO sensitivity at the time of shooting. A zoom-out factor can be derived based on the ISO sensitivity at the time of shooting, as shown in FIG. 5 described later. On the other hand, a zoom-in factor is an inverse of the resultant zoom-out factor.

After the zoom factor is determined, at step S106, the prefilter 14 is used to perform a prefiltering process which is in accordance with the zoom-out factor. At the next step S107, a zoom-out process is performed by the interpolation filter 9.

At the next step S108, the noise suppression filter 10 is used to perform a two-dimensional filtering process which is in accordance with the image correlation in a range of 3 (vertical)×3 (horizontal) pixels, whereby noise is suppressed.

Note that the images before and after the aforementioned zoom-out process at step S107 contain the same object image, but that the image data is different before and after the zoom-out process. Similarly, the images before and after the process of step S108 contain the same object image, but the image data is different.

At step S109, the interpolation filter 9 is used to perform a zoom-in process.

After the zoom-in process, the image data is compressed by the encoder 11 (step S110), and the image data having been processed is recorded to the memory card (step S111).

Note that, in the case where the zoom-out factor is ×1, the subsampling process of step S107 is not performed at all, and therefore the prefiltering process of step S106 is not performed. The zoom-in process of step S109 is not performed, either.

FIG. 5 schematically shows the processes from steps S103 to S110 in FIG. 4. In FIG. 5, the processes proceed column by column, from left to right.

First, image data composed of RGB color components is obtained through an imaging process. This process corresponds to step S103.

In the next YC separation process, a luminance (Y) signal, and color difference (Cb and Cr) signals are obtained. This process corresponds to step S104 in FIG. 4.

In the next zoom-out process, the size of the image corresponding to the Y signal remains the same, but the images corresponding to the color difference (Cb and Cr) signals are reduced in size. This process corresponds to step S107.

Then, a noise reduction (noise suppression) process is performed for the Y signal and the color difference (Cb and Cr) signals which have been reduced in size. This process corresponds to step S108. After the noise reduction process, a zoom-in process corresponding to step S109 is performed.

Finally, an encoding process corresponding to step S110 is performed, whereby an image file of the JPEG format is obtained.

One feature of the processing by the image capture device 100 is that a noise reduction process is performed after performing a zoom-out process, as shown in FIG. 5.

Figure 6A:
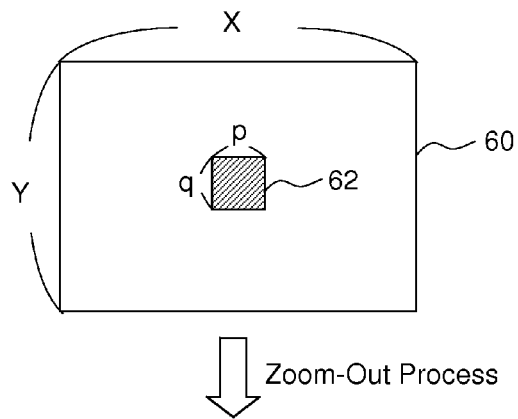
FIG. 6A is a diagram showing a relationship between an image 60 before being subjected to a zoom-out process and a signal block 62 used in a two-dimensional filtering process.
Figure 6B:
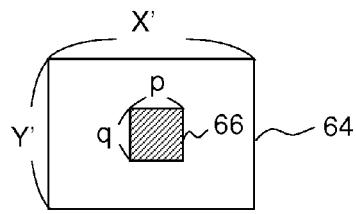
FIG. 6B is a diagram showing a relationship between an image 64 after being subjected to a zoom-out process and a signal block 66 used in a two-dimensional filtering process.

FIG. 6A shows a relationship between an image (x pixels×y pixels) 60 before being subjected to a zoom-out process and a signal block (p pixels×q pixels) 62 used for a two-dimensional filtering process. FIG. 6B shows a relationship between an image (x' pixels×y' pixels) 64 after being subjected to a zoom-out process and a signal block (p pixels×q pixels) 66 used for a two-dimensional filtering process. Since the processing ability of the noise suppression filter 10 remains the same, the processible signal block size is the same in both of FIGS. 6A and 6B.

As has been pointed out above as a problem of the conventional technique, in order to enhance the noise suppression effect, it is necessary to select neighboring pixels (to be utilized for the correlation determination of pixels) from a wide range.

As shown in FIG. 6, the ratio of the processible signal block size to the image size after the zoom-out process is greater than the ratio of the processible signal block size to the image size before the zoom-out process. Thus, a wide range in the image before the zoom-out process fits within a narrow range in the image after the zoom-out process. This is synonymous to increasing the range from which the neighboring pixels are selected. Thus, by performing a noise suppression process after performing a zoom-out process, a high noise suppression effect can be obtained.

Moreover, as compared to performing a noise suppression process over the range of x pixels×y pixels by using the signal block 62 shown in FIG. 6A as one unit, a relatively fast processing becomes possible by performing a noise suppression process over the smaller range of x' pixels×y' pixels.

There is also a further feature in that the image capture device 100 determines a zoom-out/in factor in accordance with the ISO sensitivity at the time of shooting.

Figure 7:
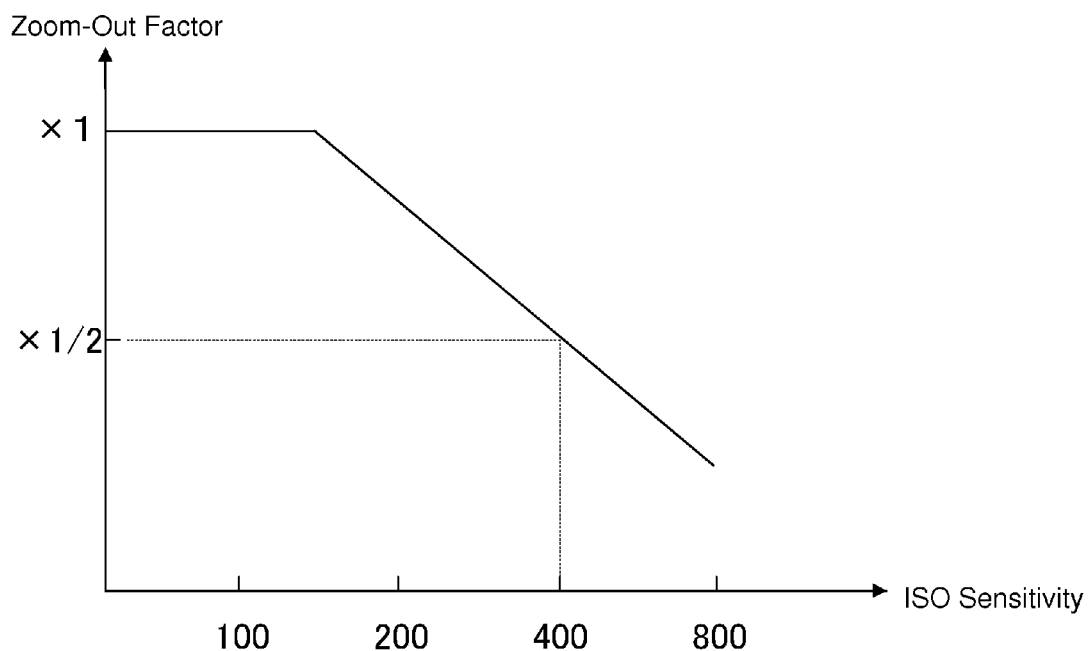
FIG. 7 is a diagram showing a relationship between the ISO sensitivity at the time of shooting and the zoom-out factor.

FIG. 7 is a diagram showing a relationship between the ISO sensitivity at the time of shooting and the zoom-out factor. The data representing the correlation as shown in FIG. 7 may be stored in a flash ROM (not shown) which is internalized in the microcomputer 12, for example. Hereinafter, exemplary cases where the ISO sensitivity is set to 100 and 400, respectively, will be illustrated.

1-2-1. Operation Under ISO Sensitivity=100

An operation under an ISO sensitivity of 100 will be described by referring to FIGS. 4 and 7 as necessary.

As shown in FIG. 7, when an ISO sensitivity of 100 is set, the zoom-out factor is determined as ×1 (step S105 in FIG. 4). A zoom factor needs to be determined with respect to each of the vertical direction and the horizontal direction. In the following descriptions, it is conveniently assumed that the same zoom factor is used with respect to both vertical and horizontal directions. However, the zoom factors along the vertical direction and the horizontal direction may be different. A relationship as shown in FIG. 7 may be defined with respect to each of the vertical direction and the horizontal direction.

In the case where the factor is ×1, the processes of steps S105 and S106 in FIG. 4 are substantially not performed. At step S108, a noise suppression process is performed. The process of the next step S109 is substantially not performed because, since a zoom-in factor is an inverse of a given zoom-out factor, the zoom-in factor in this case is also ×1.

The subsequent processes are as described with reference to FIG. 4.

1-2-2. Operation Under ISO Sensitivity=400

Similarly to the above example, an operation under an ISO sensitivity of 400 will be described by referring to FIGS. 4 and 7 as necessary.

As shown in FIG. 7, when an ISO sensitivity of 400 is set, the zoom-out factor is determined as ×½ (step S105 in FIG. 4).

After the zoom factor is determined, a prefiltering process which is in accordance with the zoom-out factor is performed in the prefilter 14 (step S106). When the zoom-out factor is ×½, a filtering process for suppressing the aliasing noise that is associated with a ½ subsampling process is performed. For example, assuming a sampling frequency Fs for the pixels before the subsampling, frequencies of Fs/4 to Fs/2 from before the subsampling are suppressed through a filtering process which carries out an addition of 2 (vertical)×2 (horizontal) pixels.

After the prefiltering process, a zoom-out process is performed by the interpolation filter 9 (step S107). The interpolation is performed by a linear interpolation process, for example.

After the zoom-out process, in the noise suppression filter 10, noise suppression by a two-dimensional filtering process which is in accordance with the image correlation in a range of 3 (vertical)×3 (horizontal) pixels is performed (step S108).

After noise suppression process, a zoom-in process is performed in the interpolation filter 9. The zoom-in factor is determined as ×2. The interpolation calculation in the zoom-in process is performed by a linear interpolation process, for example (step S109).

As described above, based on the relationship shown in FIG. 7, a factor for a zoom-out process (and a factor for a zoom-in process) is determined in accordance with the ISO sensitivity.

1-3. Effects of Processing by Image Capture Device 100

In accordance with the image capture device 100 of the present embodiment, the noise suppression filter 10 performs its processing after an electronic zoom-out process is performed. Therefore, in one time, the noise suppression filter 10 is able to apply processing to pixels from a wide region in the original image data. Thus, the circuitry scale of the noise suppression filter 10 can be reduced. Specifically, a range of 3 (vertical)×3 (horizontal) pixels which is referred to by the noise suppression filter 10 when the ISO sensitivity is set to 400 would correspond to a range of 6 (vertical)×6 (horizontal) pixels in the image before the zoom-out process.

Moreover, since pixels from a wide region in the original image data are subjected to a filtering process, noise suppression is enabled to lower frequencies. However, the resolution of the image is deteriorated since an electronic zoom-out process is performed.

Hereinafter, it will be specifically described how noise suppression even to lower frequencies becomes possible by performing a process of the noise suppression section (filtering process) after performing an electronic zoom-out process.

Figure 8:
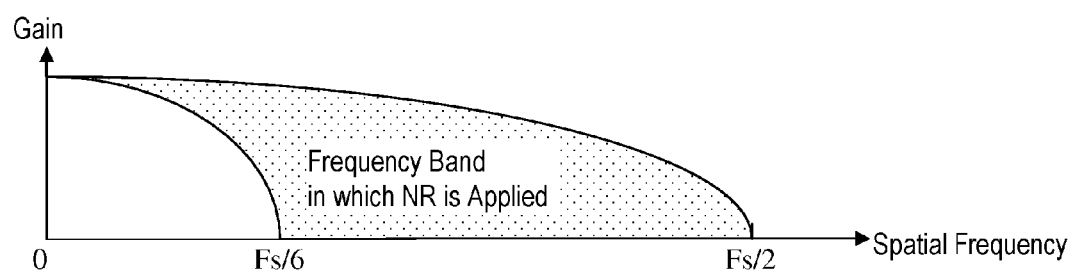
FIG. 8 is a schematic diagram showing a band which is subjected to restriction by a two-dimensional filtering process in the case where the ISO sensitivity is set to 100, i.e., when an electronic zoom-out process is not performed.

FIG. 8 is a schematic diagram showing a band which is subjected to restriction by a two-dimensional filtering process in the case where the ISO sensitivity is set to 100, i.e., when an electronic zoom-out process is not performed. The band which is subjected to restriction is shown on the spatial frequency axis (horizontal direction).

When the ISO sensitivity is 100, there is no deterioration in resolution associated with a prefiltering process and a subsampling process (or interpolation process). However, noise suppression through the two-dimensional filtering process is possible only down to near the Fs/6 band.

Therefore, by first performing an electronic zoom-out process and then a filtering process, noise suppression down to lower frequencies will become possible. On the other hand, deterioration in resolution can be suppressed by performing a filtering process without an electronic zoom-out process.

Figure 9:
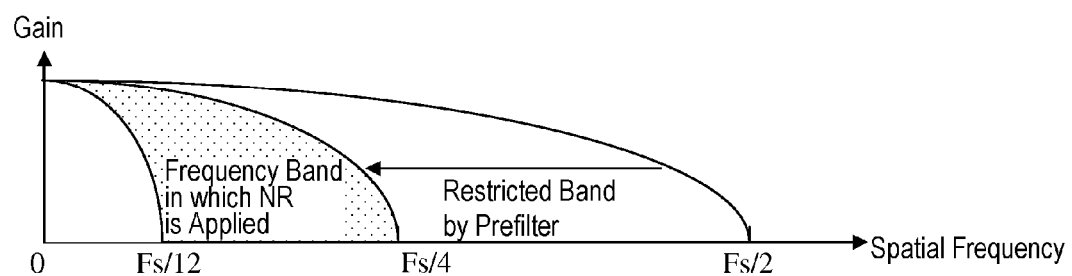
FIG. 9 is a schematic diagram showing a band which is subjected to restriction by prefiltering and two-dimensional filtering processes in the case where the ISO sensitivity is set to 400.

On the other hand, FIG. 9 is a schematic diagram showing a band which is subjected to restriction by prefiltering and two-dimensional filtering processes in the case where the ISO sensitivity is set to 400, i.e., a ×½ electronic zoom-out process is performed. The band which is subjected to restriction is shown on the spatial frequency axis (horizontal direction).

By performing a two-dimensional filtering process after performing a ×½ electronic zoom-out process, band restriction down to Fs/4 is realized through the prefiltering process and the subsampling process (or interpolation process), and noise suppression through the two-dimensional filtering process is achieved with respect to the band from Fs/12 to Fs/4. However, frequencies of Fs/4 or above are not resolved.

Under a high ISO sensitivity (e.g., ISO sensitivity=150 or above), the image capture device 100 performs a filtering process after performing an electronic zoom-out process. Under a low ISO sensitivity (e.g., ISO sensitivity<150), the image capture device 100 performs a filtering process without performing an electronic zoom-out process. In other words, in accordance with information concerning the ISO sensitivity, the factor of a zoom-out process or a zoom-in process by the interpolation filter 9 is adjusted.

Thus, it is easy to control the balance between deterioration in resolution and the effect of noise suppression process. Specifically, when the ISO sensitivity is high, a large amount of noise will be contained in the image data anyway, which makes it necessary to perform a process that provides a large noise suppression effect even at the cost of deterioration in resolution. Accordingly, when the ISO sensitivity is high, a filtering process is performed after performing an electronic zoom-out process. On the other hand, when the ISO sensitivity is low, little noise will be contained in the image data, and therefore it is unnecessary to perform any process that will provide a large noise suppression effect but will deteriorate resolution. Accordingly, when the ISO sensitivity is low, a filtering process is performed without performing an electronic zoom-out process.

Although the luminance signal and the color signals are treated similarly in the above embodiment of the present invention, different zoom factors may be applied to the luminance signal and the color signals. For example, the luminance signal may be fixed at the zoom-out factor of ×1 irrespective of ISO sensitivity, while the zoom-out factor for the color signals may be varied depending on ISO sensitivity. This will result in a process which does not cause deterioration in resolution in the luminance signal and yet provides a high NR effect for the color signals. Alternatively, the zoom-out factor for the luminance signal may be varied independently from the zoom-out factor for the color signals. In that case, the balance between NR effect and deterioration in resolution with respect to the luminance signal can be selected, independently from the NR effect and deterioration in resolution with respect to the color signals.

Although the same zoom factor is applied along both horizontal and vertical directions in the above embodiment of the present invention, different factors may be applied along the respective directions. In that case, when the pixel aspect is not square, for example, the zoom-out factor may be decreased for the narrower pixel pitch, whereby it becomes possible to obtain an NR effect while ensuring a good resolution balance along the vertical and horizontal directions.

Although the above embodiment of the present invention illustrates an example where the interpolation calculation is implemented as a linear interpolation process, a simpler interpolation calculation may be realized by a subsampling process or a process of replicating neighboring pixels, or an interpolation process using a filtering process with a greater number of taps may be performed. In the case of performing an interpolation process with a large number of taps, the filter for the interpolation process may be conveniently utilized for realizing a band restriction equivalent to what might be obtained with a prefiltering process.

Embodiment 1 illustrates an example where a noise reduction process and an electronic zoom-in process are consecutively performed after an electronic zoom-out process. However, other processes may be inserted in between these processes. That is, it is only necessary that the above three processes occur in the aforementioned order.

Embodiment 2

Next, processing by an image capture device according to Embodiment 2 of the present invention will be described. Note that the construction of the image capture device is identical to the image capture device 100 of Embodiment 1. Therefore, the image capture device of the present embodiment will be described by using the reference numerals shown in FIG. 1 and the like.

Figure 10:
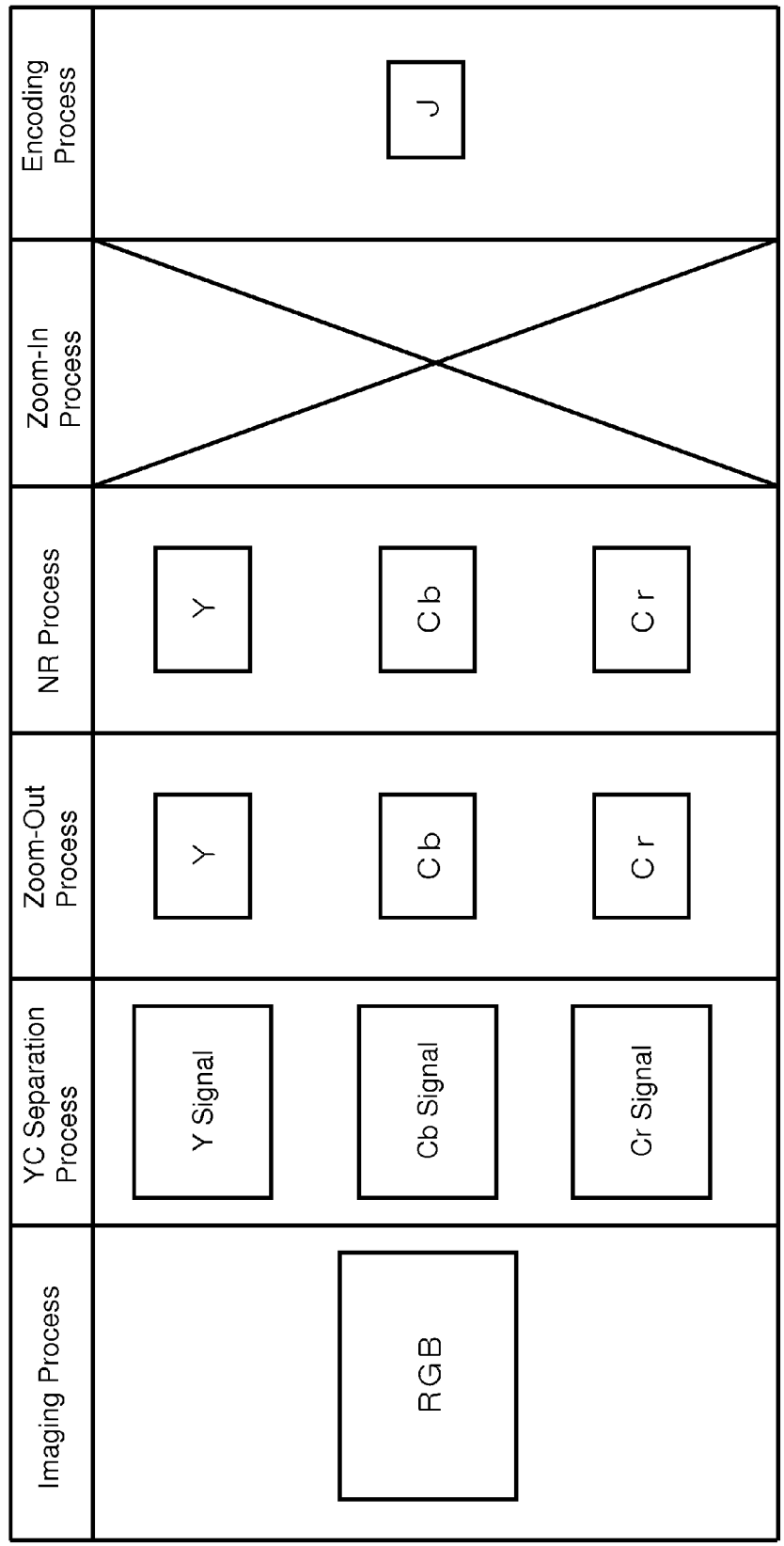
FIG. 10 is a diagram showing an outline of processing by an image capture device 100 according to Embodiment 2.

FIG. 10 shows an outline of processing by the image capture device 100 of the present embodiment.

The processing by the image capture device 100 of the present embodiment significantly differs from the processing by the image capture device of Embodiment 1 in that the zoom-in process is omitted. An exemplary case of omitting the zoom-in process may be where the user desires an image having a smaller number of pixels than the maximum number of pixels available in the image capture device 100, for example.

In the following descriptions, it is assumed that an RGB image which is obtained through an imaging process contains 10 million pixels. It is further assumed that the user has input via the manipulation section 13 a piece of information designating the image size of an image to be recorded, the designated image size being 3 million pixels.

A traditional image capture device would first perform a noise suppression process for the luminance (Y) signal and the color difference (Cb and Cr) signals resulting from a YC separation process, each having a size corresponding to 10 million pixels. Thereafter, a zoom-out process would be performed to generate an image of a size corresponding to 3 million pixels with respect to each signal, followed finally by an encoding process.

On the other hand, the image capture device 100 of the present embodiment first performs a zoom-out process and then a noise suppression process, and thereafter a compression is performed, as in the processing of Embodiment 1. In the zoom-out process, the image is reduced to 3 million pixels, which is the number of pixels as instructed by the user. This realizes adjustment to the size of the final resultant image, while retaining the advantages of the processing of Embodiment 1.

Embodiment 3

Next, processing by an image capture device of Embodiment 3 of the present invention will be described. Note that the construction of the image capture device is identical to the image capture device 100 of Embodiment 1. Therefore, the image capture device of the present embodiment will be described by using the reference numerals shown in FIG. 1 and the like.

Figure 11:
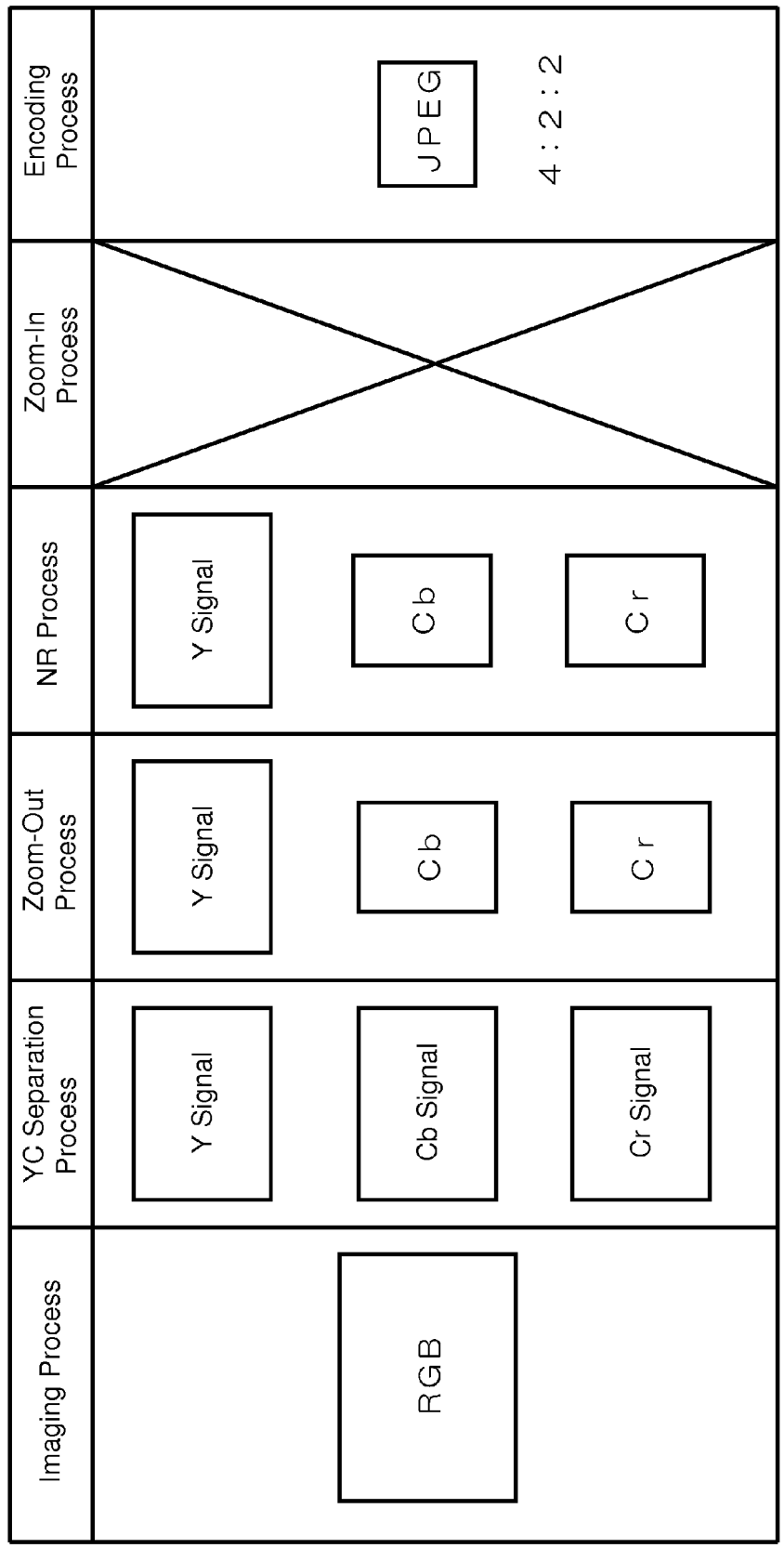
FIG. 11 is a diagram showing an outline of processing by an image capture device 100 according to Embodiment 3.
Figure 12:
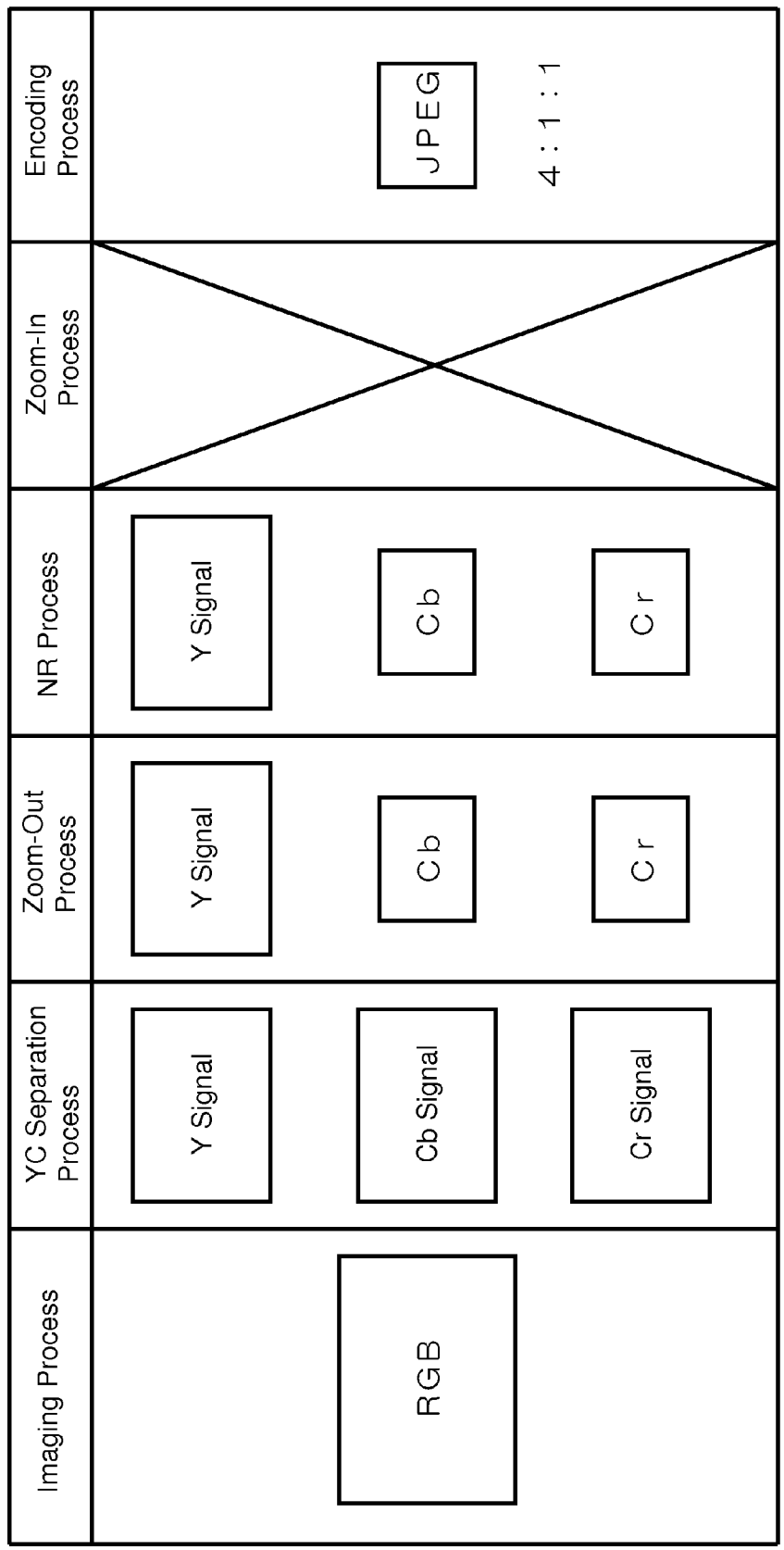
FIG. 12 is a diagram showing an outline of processing by an image capture device 100 according to Embodiment 3.

FIGS. 11 and 12 each show an outline of processing by an image capture device 100 of the present embodiment.

As in Embodiment 2, the processing by the image capture device 100 of the present embodiment omits the zoom-in process. Furthermore, in accordance with a designated image format, the image capture device 100 of the present embodiment reduces the sizes of images corresponding to the color difference (Cb and Cr) signals.

For example, assume that the format of an image to be output is designated as Y:Cb:Cr=4:2:2, as shown in FIG. 11. The designation Y:Cb:Cr=4:2:2 means that the ratio between the sampling frequencies of the luminance signal (Y), the color difference signal (Cb), and the color difference signal (Cr) is 4:2:2. In this case, the prefilter 14 and the interpolation filter 9 reduce the images corresponding to the color difference (Cb and Cr) signals so that the sampling frequencies of the color difference (Cb and Cr) signals along the horizontal direction of the image are reduced to ½.

Alternatively, assume that the format of an image to be output is designated as Y:Cb:Cr=4:1:1, as shown in FIG. 12. In this case, the prefilter 14 and the interpolation filter 9 reduce the images corresponding to the color difference (Cb and Cr) signals so that the sampling frequencies of the color difference (Cb and Cr) signals along the horizontal and vertical directions of the image are reduced to ½.

After the zoom-out process, a noise suppression process and an encoding process are performed.

Note that the aforementioned ratio Y:Cb:Cr=4:2:2 or 4:1:1 is only exemplary. Other formats may also be used.

Embodiments 2 and 3 above mainly describe methods for determining a zoom-out factor when performing a zoom-out process, while relying on the descriptions of Embodiment 1 for the noise suppression process. However, the method of the noise suppression process can also be varied in accordance with various parameters.

For example, assume that the user has input via the manipulation section 13 a piece of information specifying an image quality (compression ratio) of an image to be recorded. The kinds of image quality may be "high quality", "standard quality", and "low quality", for example. A "high quality" image has a relatively low compression ratio, whereas a "low quality" image has a relatively high compression ratio.

At this time, based on the information specifying the image quality (compression ratio) of the input image, the noise suppression filter 10 changes the criterion for making a noise determination. Specifically, the threshold value for determining presence/absence of correlation between a pixel to be processed and neighboring pixels is changed. When a high threshold value is set, a noise determination will not be made even if there is a relatively large difference in pixel values. When a low threshold value is set, a noise determination will be made even when there is a relatively small difference in pixel values. The range from which to select neighboring pixels may also be enlarged. Furthermore, the threshold value may be increased or decreased in accordance with the distance from the pixel to be processed.

As a result, the image capture device 100 is able to perform efficient processing.

The present invention is able to reduce noise contained in image data by using small-scale circuitry, and therefore is applicable to electronic apparatuses having a camera function, e.g., digital still cameras, camcorders, monitoring cameras, and mobile phones with internal cameras.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2006-226179 filed on Aug. 23, 2006 and No. 2007-215444 filed Aug. 22, 2007, the entire contents of which are hereby incorporated by reference.

What is claimed is:

1. An image capture device comprising:
an acquisition section which is used to acquire sensitivity information concerning a sensitivity;
an imager configured to generate first image data;
a zoom section configured to change a size of an image which is based on input image data, the zoom section outputting second image data which is obtained by reducing a size of an image represented by the first image data; and
a noise suppression section configured to output third image data which is obtained by reducing noise in an image represented by the second image data,
wherein in accordance with the sensitivity information, the zoom section changes a size of an image represented by the second image data which is obtained by reducing the size of the image represented by the first image data.

2. The image capture device of claim 1, further comprising a band adjuster configured to restrict a band of sampling frequencies for the first image data.

3. The image capture device of claim 1, the zoom section performs a zoom-in process for the third image data using is an inverse of the zoom factor.

4. An image capture device comprising:
a manipulation section which is used to acquire format information concerning an image format;
an imager configured to generate first image data;
a zoom section configured to output second image data which is obtained by reducing a size of an image represented by the first image data based on the format information;
a noise suppression section configured to output third image data which is obtained by reducing noise in an image represented by the second image data; and
an encoder configured to perform an encoding process for the third image data,
wherein the manipulation section acquires format information concerning a ratio of sampling frequencies of color components of light.

5. The image capture device of claim 4, further comprising a separator configured to separate and output a plurality of color component signals from the image represented by the first image data,
wherein the zoom section reduces a size of a color component image corresponding to each of the plurality of color component signals based on the format information.

6. The image capture device of claim 4, wherein,
the manipulation section further acquires compression ratio information concerning a compression ratio; and
in accordance with the compression ratio specified by the compression ratio information, the noise suppression section changes a method for reducing the noise in the image represented by the second image data.

7. An image capture device comprising:
a manipulation section which is used to acquire size information concerning an image size;
an imager configured to generate first image data;

a zoom section configured to output second image data which is obtained by reducing a size of an image represented by the first image data based on the size information;

a noise suppression section configured to output third image data which is obtained by reducing noise in an image represented by the second image data;

an encoder configured to perform an encoding process for the third image data; and a separator configured to separate and output a plurality of color component signals from the image represented by the first image data, wherein the zoom section reduces a size of a color component image corresponding to each of the plurality of color component signals based on the size information.

8. An image capture device comprising:

an acquisition section which is used to acquire sensitivity information concerning a sensitivity;

an imager configured to generate first image data;

a zoom section configured to change a size of an image which is based on input image data, the zoom section outputting second image data which is obtained by reducing a size of an image represented by the first image data; and a noise suppression section configured to output third image data which is obtained by reducing noise in an image represented by the second image data, wherein the zoom section adjusts a degree of reduction of the size of the image represented by the first image data such that a size of an image represented by the second image data becomes smaller for a higher sensitivity when the sensitivity indicated by the sensitivity information is equals to or greater than a predetermined value.

* * * * *

UNITED STATES PATENT AND TRADEMARK OFFICE
CERTIFICATE OF CORRECTION

PATENT NO.       : 7,956,907 B2
APPLICATION NO.  : 11/843310
DATED            : June 7, 2011
INVENTOR(S)      : Yukihiro Tanizoe et al.

It is certified that error appears in the above-identified patent and that said Letters Patent is hereby corrected as shown below:

Column 12, line 30, "the zoom section" should read -- wherein the zoom section --; and line 31, "is" should be deleted.

Column 14, line 15, "equals" should read -- equal --.

Signed and Sealed this
Sixth Day of December, 2011

David J. Kappos
*Director of the United States Patent and Trademark Office*